United States Patent [19]

Takahashi

[11] Patent Number: 4,786,075
[45] Date of Patent: Nov. 22, 1988

[54] SADDLE-TYPE FOUR-WHEEL VEHICLE FOR RUNNING ON UNLEVELED GROUND

[75] Inventor: Hirotake Takahashi, Sayama, Japan

[73] Assignee: Honda Giken Kogyo Kabushiki Kaisha, Tokyo, Japan

[21] Appl. No.: 947,299

[22] Filed: Dec. 29, 1986

[30] Foreign Application Priority Data

Dec. 28, 1985 [JP] Japan .................. 60-299113
Jan. 31, 1986 [JP] Japan .................. 61-19745
Jan. 31, 1986 [JP] Japan .................. 61-19746

[51] Int. Cl.$^4$ .............................................. B60G 3/00
[52] U.S. Cl. .................................... 280/696; 280/701
[58] Field of Search ............... 280/666, 667, 696, 701; 180/254

[56] References Cited

U.S. PATENT DOCUMENTS

| | | | |
|---|---|---|---|
| 2,126,085 | 8/1938 | Balz | 280/696 |
| 3,709,314 | 1/1973 | Hickey | 180/254 |
| 4,057,120 | 11/1977 | Roethlisberger | 280/667 |
| 4,620,715 | 11/1986 | Takahashi | 180/254 |
| 4,629,023 | 12/1986 | Carpanelli et al. | 280/701 |
| 4,662,467 | 5/1987 | Arai et al. | 280/666 |

FOREIGN PATENT DOCUMENTS 564662 10/1958 Canada ..................... 280/696
730510 12/1942 Fed. Rep. of Germany ...... 280/666

OTHER PUBLICATIONS

McLaren M19 Illustration, May 1981.

Primary Examiner—John J. Love
Assistant Examiner—Ross Weaver
Attorney, Agent, or Firm—Armstrong, Nikaido, Marmelstein & Kubovcik

[57] ABSTRACT

A saddle type four-wheel vehicle or buggy car for running on the unleveled ground in which a driver sits astriding on a saddle-type seat, and front and rear wheels are each provided with a tire of low pressure and wide width. The right and left front wheels driven by an engine are suspended on a vehicle body independently through an arm. Between the arm and the vehicle body, a shock absorber is disposed in such a posture as to direct in the generally horizontal direction. A drive gear case connected with the engine is placed at a forward location of a front axle. The drive gear case and the front axle are interconnected through a drive shaft having a universal joint at each end thereof. Otherwise, the front and rear wheels are suspended on the vehicle body through a front fork and a rear fork respectively, and the front wheels are driven by the engine through a drive shaft while the rear wheels are driven by the engine through a chain.

4 Claims, 7 Drawing Sheets

SADDLE-TYPE FOUR-WHEEL VEHICLE FOR RUNNING ON UNLEVELED GROUND

BACKGROUND OF THE INVENTION

The field of the present invention is a saddle-type four-wheel vehicle for running on the unleveled ground in which a driver sits on a saddle-type seat astriding thereover as he does on a motorcycle.

In recent years, four-wheel vehicles for running on the unleveled ground which are generally called as buggy cars are being widely used as leasure cars or utility cars. These vehicles, like motorcycles, have a vehicle body frame formed of a pipe material, a rod-like handle and a saddle-type seat. Front and rear wheels for them are each provided with a tire of low pressure and wide width which is generally called as balloon tire. In such buggy cars, in order to prevent a suspension apparatus and a drive apparatus from contacting the ground due to large up and down movements when the cars are running on the unleveled ground, the minimum height on ground of the vehicle body is required to be made as high as possible.

Figure 1:
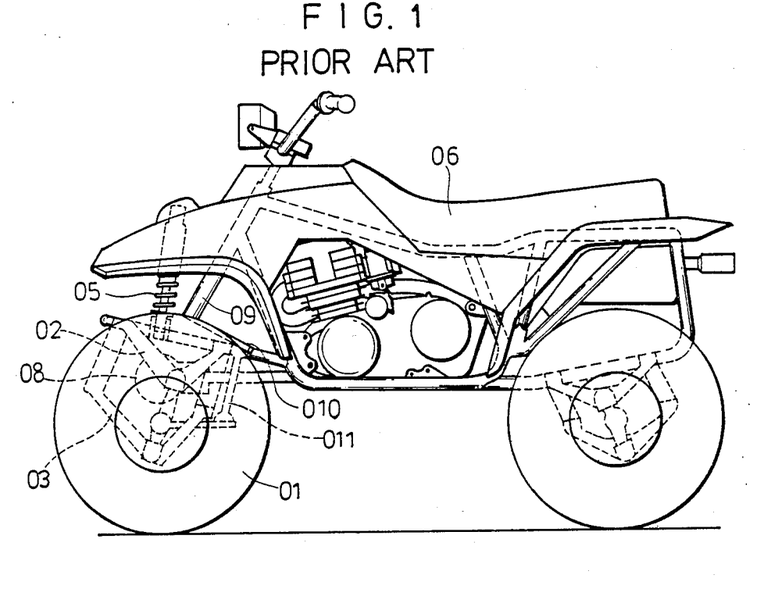
FIG. 1 is a side view of a conventional saddle-type four-wheel vehicle for running on the unleveled ground.
Figure 2:
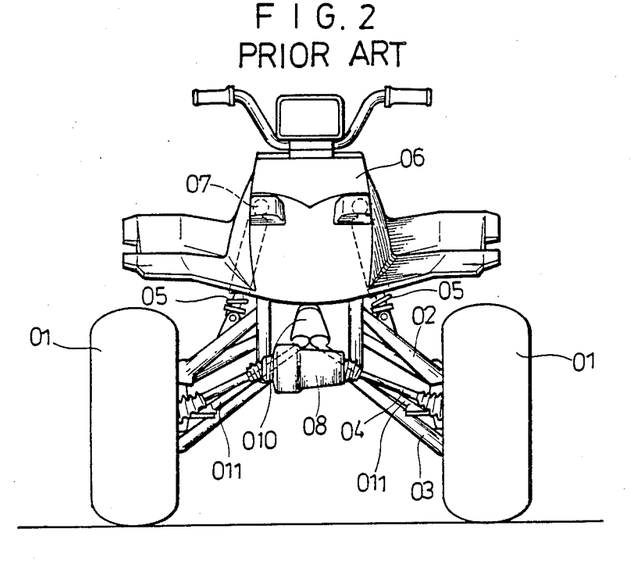
FIG. 2 is a front view thereof.

In order to meet with the above requirements, there is known a conventional buggy car as shown in FIGS. 1 and 2. In this buggy car, in order to make the minimum height on ground as high as possible, an upper arm 02 and a lower arm 03 for supporting an axle 01 are formed in V-shapes in side view as shown in the figures, and the axle 01 is supported on the lowest portions of these arms. However, because of a provision of a drive shaft 04, a shock absorber 05 is difficult to be mounted on the lower arm 03 and therefore the shock absorber 05 is disposed between the upper arm 02 and a vehicle body 06 in such a fashion as to extend in the vertical direction. Due to the foregoing arrangement, a mounting portion 07 of an upper end of the shock absorber 05 to a vehicle body becomes high which gives an inconvenience in space layout or a problem in that the center of gravity of the vehicle becomes high since the vehicle body itself becomes high.

Furthermore, in the above-described conventional buggy car, since a drive gear case 08 adapted to transmit power from the engine to the front wheels 01 is disposed right above the rotary axis of the front wheel 01 and on the center in the width direction of the vehicle body, this drive gear case 08 is located on an extension of a handle shaft 09 extending downwardly. Therefore, a steering lever 010 attached to a lower end of the handle shaft 09 is necessarily located at a position higher than the drive gear case 08. Due to the foregoing positional relation, the angle of inclination of a tie rod 011 with respect to the ground becomes large, and the toe interference of tires due to cushion stroke becomes such extent as unable to disregard.

It is an advantage of a buggy car that a driver can enjoy a steering operation by shifting his weight when he turns the car while running on the unleveled ground or rides over an obstacle. In such buggy car, light weight of a vehicle body is desirable since the posture of the vehicle body is controlled by shifting a driver's weight.

SUMMARY OF THE INVENTION

It is therefore a principal object of the present invention to provide an improved saddle-type four-wheel vehicle for running on the unleveled ground, wherein the minimum height on ground of a vehicle body is made high while maintaining the center of gravity of the vehicle body low.

Another object of the invention is a provision of a saddle-type four-wheel vehicle for running on the unleveled ground, wherein the toe interference due to cushion stroke is minimized.

A further object of the invention is a provision of a saddle-type four-wheel vehicle for running on the unleveled ground, wherein a vehicle body is made light in weight so that the vehicle body can be more easily controlled.

According to one aspect of the present invention, there is a provision of a saddle-type four-wheel vehicle for running on the unleveled ground, wherein right and left front wheels, which are driven by an engine, are suspended on a vehicle body independently through an arm respectively, and a shock absorber is disposed between the arm and the vehicle body in such a posture as to extend in the generally horizontal direction. In this saddle-type four-wheel vehicle for running on the unleveled ground, the minimum height on ground of the vehicle body can be made high by suspending, for example, the afore-mentioned V-shaped upper and lower arms on the vehicle body, while the center of gravity of the vehicle body can be made low by lowering the height at the uppermost portion of the vehicle body by disposing a shock absorber in a generally horizontal direction.

According to another aspect of the invention, there is a provision of a saddle-type four-wheel vehicle for running on the unleveled ground, wherein a drive gear case, which is connected with an engine, is placed at a location forward of a front axle, and the drive gear case and the front axle are interconnected through a drive shaft having a universal joint on both ends thereof. In this saddle-type four-wheel vehicle, a steering shaft can be sufficiently extended downward while avoiding an interference with the drive gear case. Therefore, a tie rod adapted to interconnect a lower end of a steering shaft and the front wheels is disposed at a location backward of said drive gear case in such a posture as to extend at slight angles almost like horizontal. Due to the foregoing arrangement, the toe interference due to cushion stroke can be minimized.

According to a further aspect of the invention, there is a provision of a saddle-type four-wheel vehicle for running on the unleveled ground, wherein the front and rear wheels are suspended on a vehicle body through a front fork and a rear fork respectively, the front wheels are driven by the engine through a drive shaft and the rear wheels are driven by the engine through a chain. Generally, in a chain-driven buggy car, a chain sprocket, which is disposed at an axle side, becomes large owing to the necessity to obtain a certain degree of reduction speed ratio, which inevitably results in lowness of the minimum height on ground of the vehicle body. On the other hand, however, the employment of the chain-driven system is helpful in making the vehicle body light in weight. In the above-described saddle-type four-wheel vehicle for running on the unleveled ground, it is capable that a front portion of the vehicle body, which is tended to contact the ground when running on the unleveled ground, is made high in minimum height on ground by allowing the front wheels to be driven by a drive shaft, and that the posture of the vehicle body is easily controlled due to reduction of the weight of the vehicle body by allowing the rear wheels to be driven by a chain.

DETAILED DESCRIPTION OF THE PREFERRED EMBODIMENTS

Referring first to FIGS. 3 through 7, one embodiment of the present invention will be described.

A vehicle body 2 of a saddle-type four-wheel vehicle 1 for running on the unleveled ground is formed of a pipe material. At the center of the vehicle body 2, an engine 3 is loaded. Front wheels 4 and rear wheels 5 are suspended on the vehicle body 2 through a wishbone-type front suspension 6 and a wishbone-type rear suspension 7 respectively. The front wheel 4 is rotated through a power transmission system 8.

Figure 6:
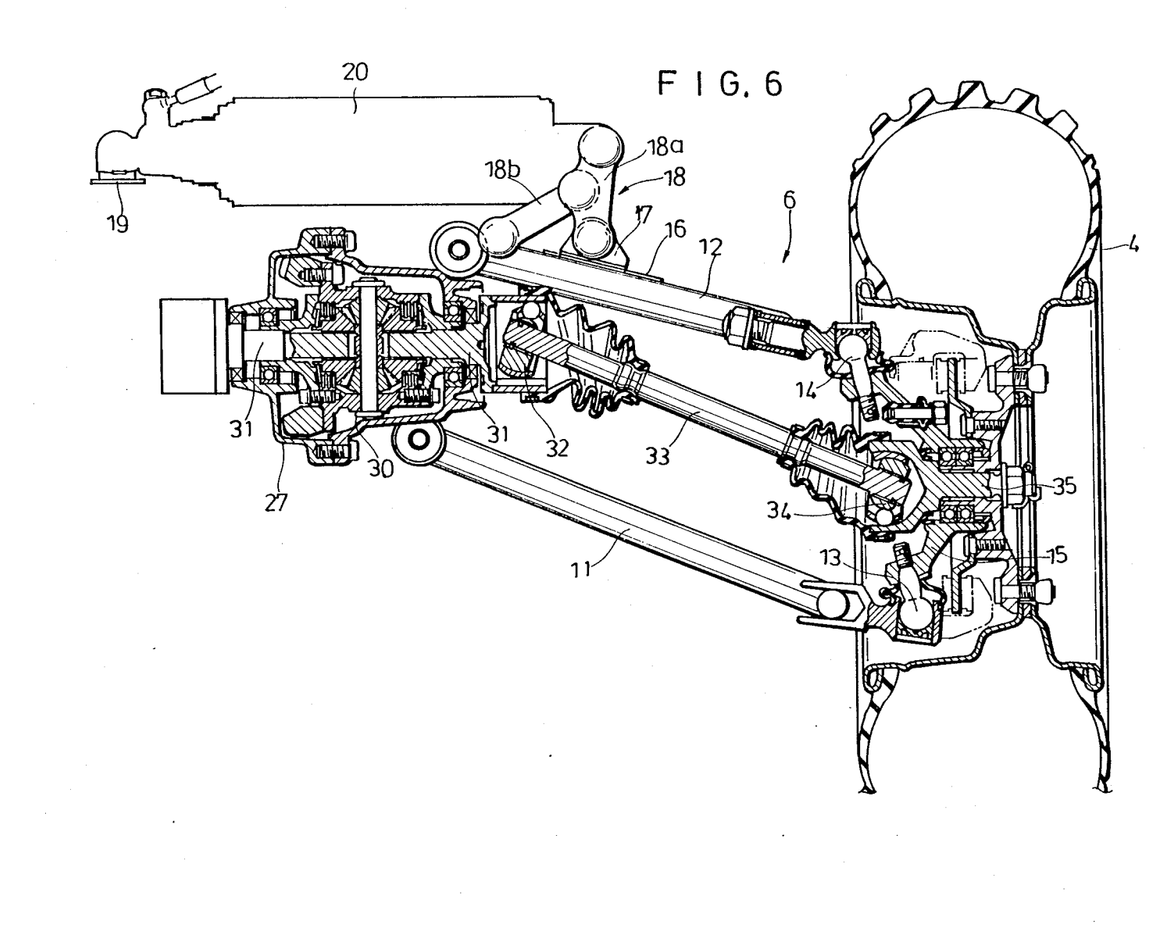
FIG. 6 is an enlarged vertical sectional front view of a part thereof.

The front suspension 6 is provided with a lower arm 11 and an upper arm 12. These arms 11, 12 are formed in V-shapes. The arms 11, 12 are pivotally attached at both ends thereof to brackets 9, 10 of the vehicle body 2 respectively and extend outwardly and downwardly in the width direction of the vehicle body. And, at the apex portions of the V-shape, king pins 13, 14 are provided. Pivotally attached to the king pins 13, 14 is a knuckle 15 adapted to rotatably support the front wheels 4. On an upper surface of the upper arm 12, a bracket 17 is secured through a plate 16 as shown in FIG. 6. One end of a link element 18a of a progressive link 18 is pivotally attached to the bracket 17. The other end of the link element 18a is pivotally attached to one end of a shock absorber 20. Another link element 18b of the progressive link 18 is pivotally attached at both ends thereof to the link element 18a and the vehicle body 2 respectively. The shock absorber 20 generally horizontally extends in the left and right direction of the vehicle body, and the other end thereof is pivotally attached to a bracket 19 provided on the vehicle body 2. Since the wishbone-type front suspension 6 is such constructed as described above, a suspension spring constant is increased as the lower arm 11 and the upper arm 12 move upwardly.

Figure 3:
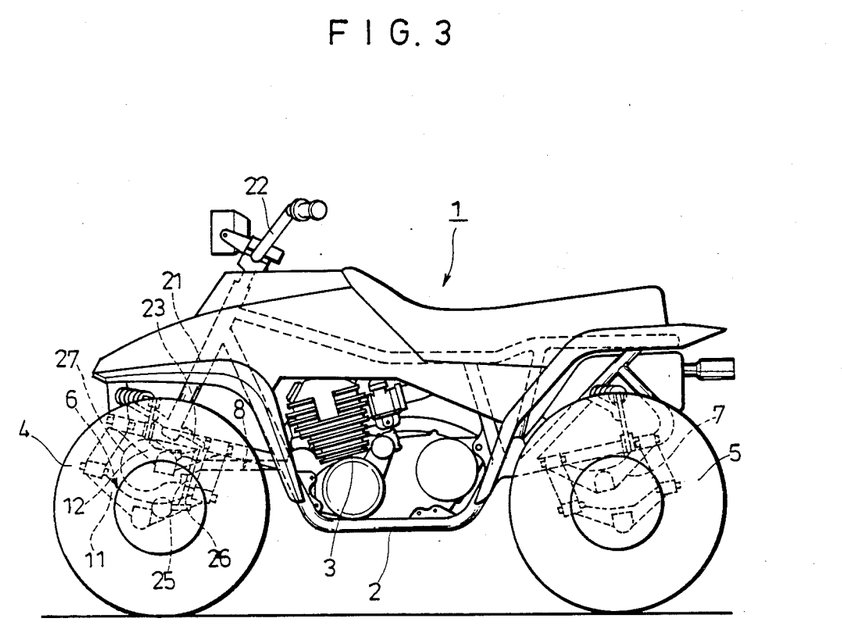
FIG. 3 is a side view of a saddle-type four-wheel vehicle for running on the unleveled ground according to the present invention.
Figure 4:
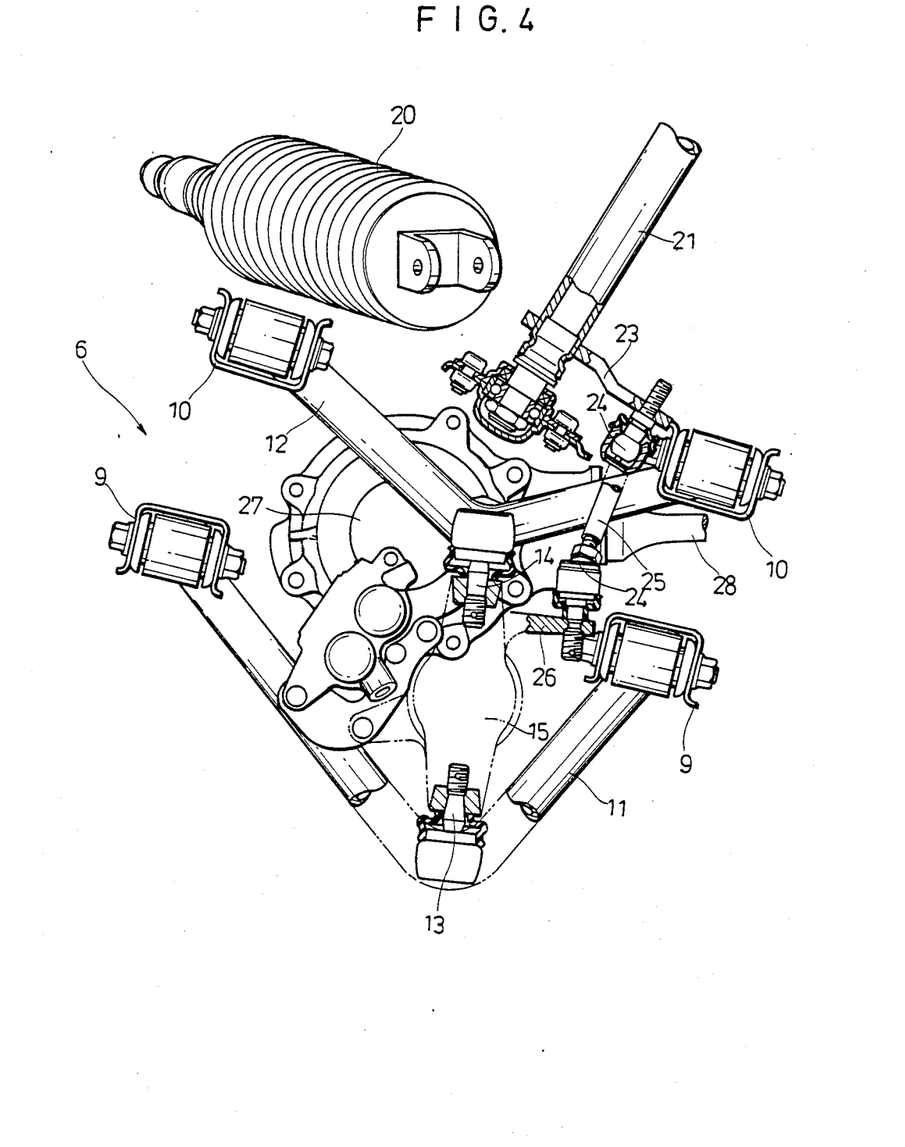
FIG. 4 is an enlarged side view of a part thereof.
Figure 5:
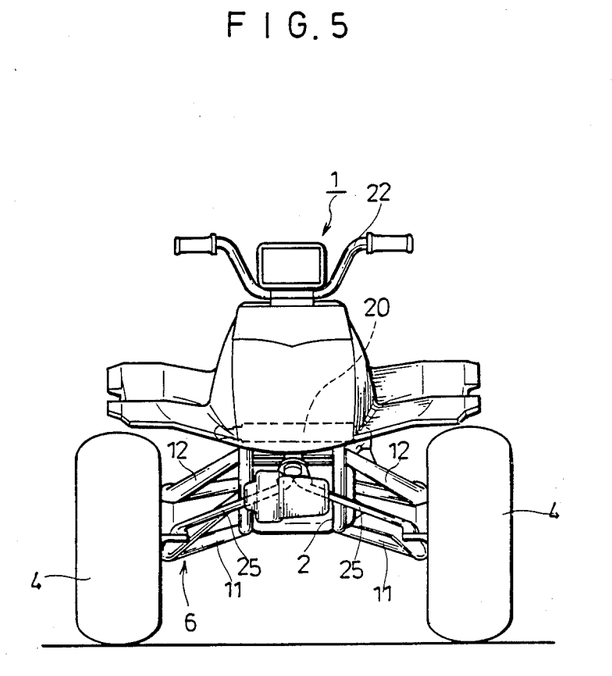
FIG. 5 is a front view of the saddle-type four-wheel vehicle for running on the unleveled ground.

As is shown in FIG. 3, at a front portion of the vehicle body 2, a forwardly and backwardly inclined steering shaft 21 with its lower part positioned forwardly is revolvably supported. A rod-like steering handle 22 is secured to an upper end of the steering shaft 21. At a lower end of the steering shaft 21, a backwardly extending steering arm 23 is secured as shown in FIG. 4. An end of the steering arm 23 and an end of a knuckle arm 26, which is integrally formed with the knuckle 15, are interconnected through ball joints 24, 24 and a tie rod 25. Therefore, when the rod-like steering handle 22 is revolved leftwardly and rightwardly, the front wheels 4 are steered leftwardly and rightwardly.

Figure 7:
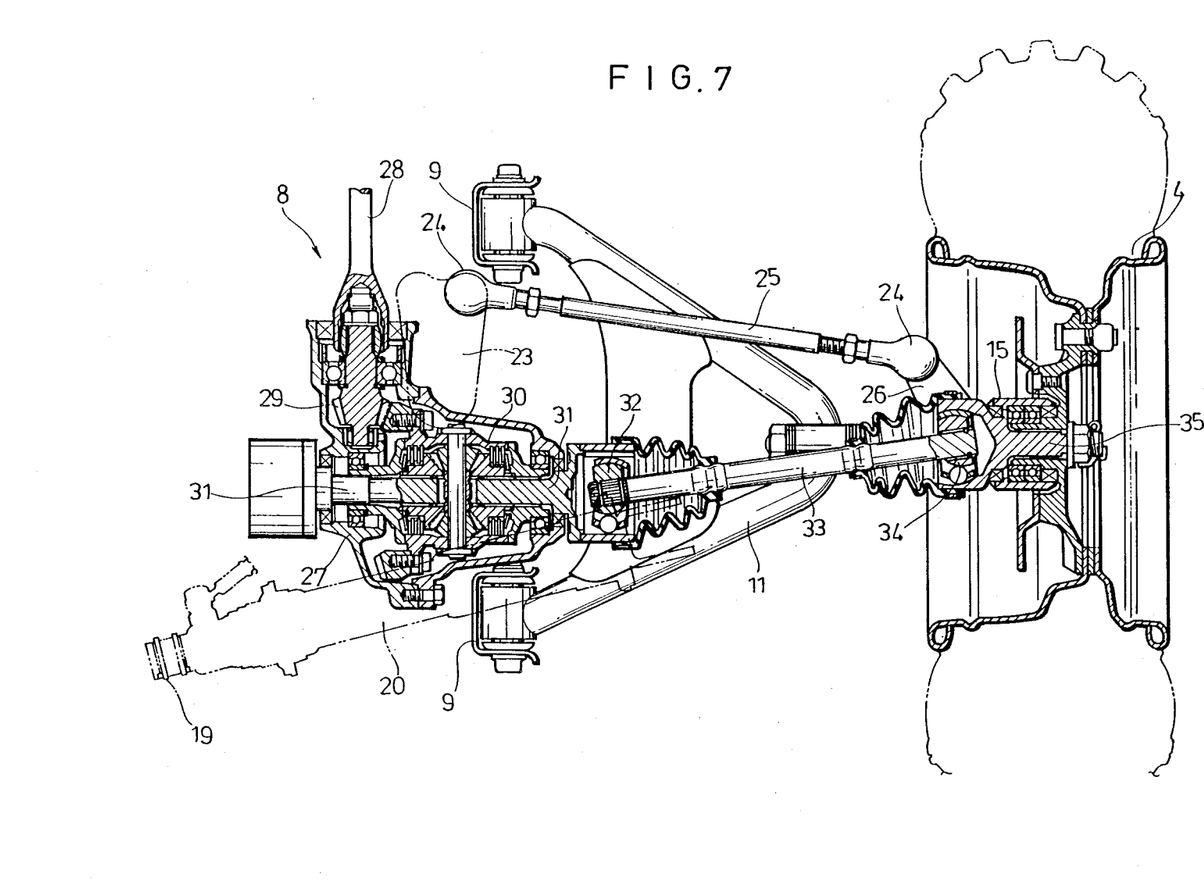
FIG. 7 is a plan view thereof.

At a forward and upperward position of a wheel center of the front wheel, a drive gear case 27 is located. This drive gear case 27 is connected with the engine 3 through an input shaft 28 (see FIG. 7) which constitutes the power transmission system 8. The input shaft 28 is connected with a differential gear 30 within the drive gear case 27 through an input gear 29. An output shaft 31 of the differential gear 30 is connected with an axle 35 of the front wheel 4 through a universal joint 32, a transmission shaft 33 and a universal joint 34. As is shown in FIG. 6, the joint 34 is arranged as such that the center thereof is positioned on the center line of the king pins 13, 14. Although only one front wheel 4 of the pair of left and right front wheels is shown in FIGS. 6 and 7, the other end of the output shaft 31 is connected to the other front wheel in the same manner as described above.

Since the drive gear case 27 is located at a forward position of the wheel center line of the front wheels 4, the steering shaft 21, which extends toward the wheel center line from above, can be sufficiently extended downward without being disturbed by the drive gear case 27. Therefore, the tie rod 25 adapted to interconnect the steering arm 23 at the lower end of the steering shaft 21 and the knuckle arm 26 is disposed at angles almost like horizontal, and when the steering force applied to the rod-like steering handle 22 is transmitted to the knuckle arm 26 through steering shaft 21, steering arm 23, ball joint 24, tie rod 25 and ball joint 24, the bending moment of the tie rod 25 is small and the force along the longitutinal direction of the tie rod 25 is effectively transmitted to the knuckle arm 26. Furthermore, undue force is not acted on the knuckle arm 26 and the steering system can be made light in weight.

The above-described almost horizontal disposition of the tie rod also minimizes the toe interference caused by cushion stroke of the front wheels.

In this embodiment, the minimum height on ground of the vehicle body is made high by allowing the lower arms 11 and the upper arm 12 to extend outwardly and downwardly from the vehicle body 2, while the center of gravity of the vehicle body can be lowered by making the height of the uppermost portion of the vehicle body since the shock absorber 20 is directed in the horizontal direction.

Figure 8:
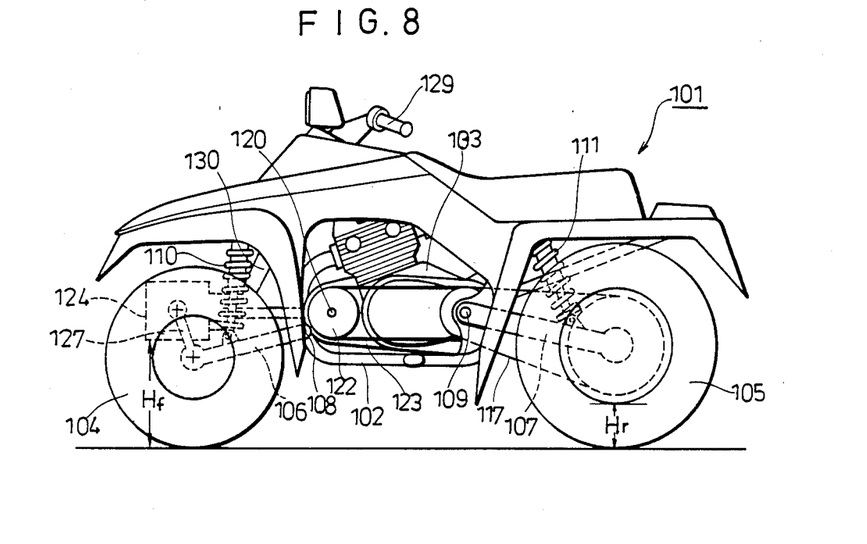
FIG. 8 is a side view of another embodiment of the present invention.
Figure 9:
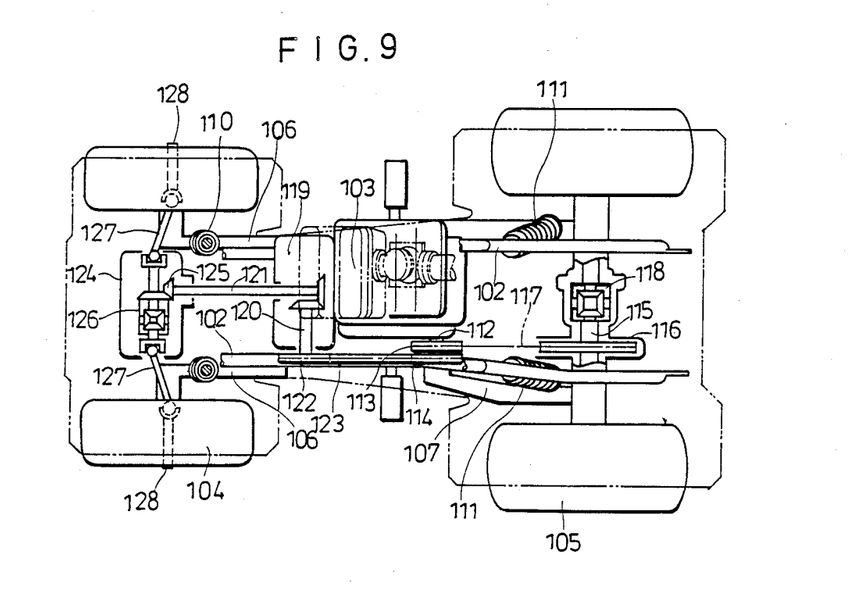
FIG. 9 is a plan view thereof.

Referring next to FIGS. 8 and 9, there will be described another embodiment of the present invention.

A vehicle body frame 102 of a saddle-type four-wheel vehicle 101 for running on the unleveled ground is formed of a pipe material. At the center of this vehicle body frame 101, an engine 103 is provided. Front wheels 104 and rear wheels 105 are pivotally attached to the outer ends of the front fork 106 and the rear fork 107 respectively. The inner ends of the front fork 106 and the rear fork 107 are pivotally supported on the vehicle body 102 through a swing arm pivot 108 and a swing arm pivot 109 respectively. The front fork 106 and the rear fork 107 are supported by the vehicle body frame 102 through cushion units 110, 111 respectively.

A crank shaft (not shown) of the engine 103, which is coaxially arranged with the swing arm pivot 109 of the rear fork 107, is connected to a drive shaft 112 through a clutch (not shown). Chain sprockets 113, 114 are integrally secured to the drive shaft 112. A chain 117 is looped around the chain sprocket 113 and a chain sprocket 116 which is integrally formed with a rear axle 115, and the rear axle 115 is provided with a differential gear 118.

A transmission apparatus 119 is disposed at a forward location of the engine 103. On an input shaft 120 of the transmission apparatus 119 which is parallel with the drive shaft 112, a chain sprocket 122 is integrally mounted. A chain 123 is looped around the chain sprocket 114 and the chain sprocket 122. An output shaft 121 directing forwardly at right angles with respect to the input shaft 120 is connected with an input gear 125 of a drive gear case 124. The input gear 125 is connected to the front axle 128 through a differential gear 126 and a transmission shaft 127.

A rod-like handle 129 is revolvably attached to the vehicle frame 102. A steering shaft 130, which is integrally formed with the rod-like steering handle 129, is connected with the front wheels 104 through a steering connection mechanism (not shown). Therefore, when the rod-like steering handle 120 is revolved leftwardly and rightwardly, the front wheels 104 are steered leftwardly and rightwardly according to the revolving amount of the handle 129.

Since this embodiment is such constructed as described above, when the engine 103 is started and the clutch (not shown) is coupled, the chain sprocket 113 and the chain sprocket 114 are driven for rotation, the chain sprocket 116 is rotated through the chain 117 looped around the chain sprocket 113, and the rear wheel 105 is driven through the rear axle 115. At the same time, the chain sprocket 122, the input shaft 120 and the output shaft 121 of the transmission apparatus 119 are rotated through the chain 123 looped around the chain sprocket 114, the front axle 128 is rotated due to rotation of the input gear 125 integrally formed with the output shaft 121 through the differential gear 126 and the transmission shaft 127.

Since the drive gear case 124 is held in a position higher than the center of the front wheels 104, the height Hf on ground of the front portion of the vehicle body becomes much higher than the height Hr on ground of the rear portion of the vehicle body. As a result, a bottom portion at the front part of the vehicle body where the vehicle body frame 102 is violently moved up and down due to uneven ground surface can be avoided from being contacted or hit the ground surface.

Furthermore, since the rear wheel 105 is driven by a chain instead of a drive shaft, the weight of the vehicle can be reduced to that extent. Thus, there can be obtained an easier steering operation of the saddle-type four-wheel vehicle 101 for running on the unleveled ground.

I claim:

1. A saddle-type four wheel vehicle for running on unleveled ground, said vehicle having right and left front wheels, a vehicle body and an engine each of said wheels being suspended on said vehicle body independently of the other of said wheels by a suspension system having upper and lower arms, each suspension system having a shock absorber connected at one of its ends to an upper arm, intermediate the ends of said upper arm and at its other end to said vehicle body, said shock absorber being connected to said upper arm by a linkage which comprises a first link attached at one of its ends to the vehicle frame and, at its other end, to the intermediate portion of a second link, said second link being connected at one of its ends to said shock absorber and, at its other end, to said upper arm and drive means connecting said front wheels to said engine.

2. A saddle-type four-wheel vehicle for running on the unleveled ground as claimed in claim 1, wherein said one end of the shock absorber is connected with said upper arm through a progressive link mechanism.

3. A saddle-type four-wheel vehicle for running on unleveled ground as claimed in claim 2, wherein said drive means includes a drive gear case connected to said engine and a front axle, said drive gear case being located forward of said front axle, and said drive gear case and said front axle are interconnected through a drive shaft having a universal joint on each end thereof.

4. A saddle-type four-wheel vehicle for running on the unleveled ground as claimed in claim 3, wherein said vehicle has a steering shaft and a tie rod interconnecting said steering shaft and said front wheels, said tie rod being disposed at a location backward of said drive gear case in a posture extending at angles substantially horizontal.

* * * * *